United States Patent
Rana et al.

(10) Patent No.: US 11,085,002 B2
(45) Date of Patent: Aug. 10, 2021

(54) DEVELOPMENT OF A NOVEL HIGH TEMPERATURE STABLE SCAVENGER FOR REMOVAL OF HYDROGEN SULFIDE

(71) Applicant: ChampionX USA Inc., Sugar Land, TX (US)

(72) Inventors: Geeta Rana, Sugar Land, TX (US); Julian M. Gallardo, Pearland, TX (US); Matthew Trevino, Houston, TX (US)

(73) Assignee: ChampionX USA Inc., Sugar Land, TX (US)

( * ) Notice: Subject to any disclaimer, the term of this patent is extended or adjusted under 35 U.S.C. 154(b) by 337 days.

(21) Appl. No.: 16/358,445

(22) Filed: Mar. 19, 2019

(65) Prior Publication Data

US 2019/0211278 A1 Jul. 11, 2019

Related U.S. Application Data

(62) Division of application No. 15/135,088, filed on Apr. 21, 2016, now Pat. No. 10,308,886.

(Continued)

(51) Int. Cl.
*C10L 3/10* (2006.01)
*C10G 29/20* (2006.01)
(Continued)

(52) U.S. Cl.
CPC ............. *C10L 3/103* (2013.01); *B01D 53/52* (2013.01); *B01D 53/78* (2013.01); *C10G 29/20* (2013.01);
(Continued)

(58) Field of Classification Search
CPC .... B01D 53/52; B01D 53/78; B01D 53/1493; B01D 2252/202; B01D 2252/2023;
(Continued)

(56) References Cited

U.S. PATENT DOCUMENTS 169,949 A   12/1875  Brown et al.
2,776,870 A  1/1957  Fischer
(Continued)

FOREIGN PATENT DOCUMENTS

CA   1257606 A   7/1989
CA   1283397 C   4/1991
(Continued)

OTHER PUBLICATIONS

Amararene, Fatiha et al., "Study of Hydrogen Sulfide Absorption with Diethanolamine in Methanolic Aqueous Solutions" Chemical Engineering Transactions (2016) 52: 259-264.
(Continued)

*Primary Examiner* — Anita Nassiri-Motlagh
(74) *Attorney, Agent, or Firm* — Eric Babych; Barnes & Thornburg LLP

(57) ABSTRACT

The present disclosure provides compositions and methods that are useful in removing, lowering the amount of, or otherwise controlling hydrogen sulfide and mercaptans. The compositions and methods can be used in any industry where hydrogen sulfide poses problems, such as when dealing with crude oil based, natural gas based, and/or coal based products. The present disclosure provides compositions and methods that can reduce the amount of or eliminate hydrogen sulfide in a variety of mediums.

15 Claims, 1 Drawing Sheet

Related U.S. Application Data

(60) Provisional application No. 62/151,083, filed on Apr. 22, 2015.

(51) Int. Cl.

| | | |
|---|---|---|
| *B01D 53/78* | (2006.01) | |
| *B01D 53/52* | (2006.01) | |
| *B01D 53/14* | (2006.01) | |
| *C10G 29/22* | (2006.01) | |
| *C10G 29/26* | (2006.01) | |
| *C10G 75/02* | (2006.01) | |

(52) U.S. Cl.
CPC ............ *C10G 29/22* (2013.01); *C10G 29/26* (2013.01); *C10G 75/02* (2013.01); *B01D 53/1468* (2013.01); *B01D 53/1493* (2013.01); *B01D 2252/202* (2013.01); *B01D 2252/205* (2013.01); *B01D 2252/2023* (2013.01); *B01D 2252/20431* (2013.01); *B01D 2252/602* (2013.01); *B01D 2256/24* (2013.01); *B01D 2257/304* (2013.01); *B01D 2257/306* (2013.01); *C10G 2300/207* (2013.01); *C10G 2300/80* (2013.01); *C10L 2290/545* (2013.01)

(58) Field of Classification Search
CPC .... B01D 2252/20431; B01D 2252/205; B01D 2252/602; B01D 2256/24; C10L 3/103; C10G 29/20; C10G 29/22; C10G 29/26; C10G 75/02
USPC .......................................................... 423/228
See application file for complete search history.

(56) References Cited

U.S. PATENT DOCUMENTS

| | | | |
|---|---|---|---|
| 2,878,294 A | | 3/1959 | Kress |
| 2,900,350 A | | 8/1959 | Kirkpatrick |
| 3,071,433 A | | 1/1963 | Dunn |
| 3,458,444 A | | 7/1969 | Shepherd et al. |
| 3,519,691 A | | 7/1970 | von Portatius |
| 3,855,210 A | | 12/1974 | Keller |
| 3,880,784 A | | 4/1975 | Wagner et al. |
| 3,888,668 A | | 6/1975 | Keller |
| 4,036,942 A | | 7/1977 | Sibeud et al. |
| 4,107,106 A | | 8/1978 | Dunleavy et al. |
| 4,195,151 A | | 3/1980 | Dunleavy et al. |
| 4,327,092 A | | 4/1982 | Collington et al. |
| 4,342,756 A | | 8/1982 | Collington et al. |
| 4,359,450 A | * | 11/1982 | Blytas ................... C10K 1/105 423/226 |
| 4,410,436 A | | 10/1983 | Holstedt et al. |
| 4,412,928 A | | 11/1983 | Holstedt et al. |
| 4,557,843 A | | 12/1985 | Holstedt et al. |
| 4,623,474 A | | 11/1986 | Holstedt et al. |
| 4,627,930 A | | 12/1986 | Holstedt et al. |
| 4,629,579 A | | 12/1986 | Jessup et al. |
| 4,629,580 A | | 12/1986 | Holstedt et al. |
| 4,657,686 A | | 4/1987 | Holstedt et al. |
| 4,680,127 A | | 7/1987 | Edmondson |
| 4,724,099 A | | 2/1988 | Holstedt et al. |
| 4,748,011 A | | 5/1988 | Baize |
| 4,756,842 A | | 7/1988 | Holstedt et al. |
| 4,760,133 A | | 7/1988 | Niwa et al. |
| 4,801,729 A | | 1/1989 | Holstedt et al. |
| 4,892,670 A | | 1/1990 | Mendelson |
| 5,213,680 A | | 5/1993 | Kremer et al. |
| 5,304,361 A | | 4/1994 | Parisi |
| 5,700,438 A | | 12/1997 | Miller |
| 6,048,968 A | | 4/2000 | Etzbach et al. |
| 6,267,913 B1 | | 7/2001 | Marder et al. |
| 6,544,492 B1 | | 4/2003 | DeBerry |
| 6,608,228 B1 | | 8/2003 | Cumpston et al. |
| 6,942,037 B1 | | 9/2005 | Arnold et al. |
| 7,078,005 B2 | | 7/2006 | Smith et al. |
| 7,235,194 B2 | | 6/2007 | Cumpston et al. |
| 7,438,877 B2 | | 10/2008 | Salma et al. |
| 7,781,187 B2 | | 8/2010 | Gasper et al. |
| 8,173,635 B2 | | 5/2012 | Jimenez et al. |
| 8,197,722 B2 | | 6/2012 | Marder et al. |
| 8,367,697 B2 | | 2/2013 | Jimenez et al. |
| 8,597,549 B2 | | 12/2013 | Cumpston et al. |
| 8,734,637 B2 | | 5/2014 | Taylor |
| 9,347,010 B2 | | 5/2016 | Gonzalez et al. |
| 9,468,882 B2 | | 10/2016 | Laroche et al. |
| 9,523,045 B2 | | 12/2016 | Harrington et al. |
| 2002/0185634 A1 | | 12/2002 | Marder et al. |
| 2004/0086443 A1 | | 5/2004 | Schield et al. |
| 2004/0096382 A1 | | 5/2004 | Smith et al. |
| 2004/0110984 A1 | | 6/2004 | Cumpston et al. |
| 2005/0238556 A1 | | 10/2005 | Pakulski et al. |
| 2007/0154980 A1 | | 7/2007 | Gasper et al. |
| 2008/0283804 A1 | | 11/2008 | Cumpston et al. |
| 2009/0291937 A1 | | 11/2009 | Jimenez et al. |
| 2011/0031165 A1 | | 2/2011 | Karas et al. |
| 2011/0155646 A1 | | 6/2011 | Karas et al. |
| 2011/0220551 A1 | | 9/2011 | Taylor |
| 2012/0149680 A1 | | 6/2012 | Jimenez et al. |
| 2012/0012507 A1 | | 9/2012 | Compton et al. |
| 2012/0241361 A1 | | 9/2012 | Ramachandran et al. |
| 2013/0172623 A1 | | 7/2013 | Kaplan |
| 2013/0240409 A1 | | 9/2013 | Subramaniyam |
| 2013/0274426 A1 | | 10/2013 | Sugiura et al. |
| 2013/0299734 A1 | | 11/2013 | Yang et al. |
| 2014/0041893 A1 | | 2/2014 | Adams et al. |
| 2014/0166282 A1 | | 6/2014 | Martinez et al. |
| 2014/0166288 A1 | | 6/2014 | Bailey et al. |
| 2014/0166289 A1 | | 6/2014 | Martinez et al. |
| 2014/0190870 A1 | | 7/2014 | Lehrer et al. |
| 2014/0209510 A1 | | 7/2014 | Harrington et al. |
| 2014/0234191 A1 | | 8/2014 | Laroche et al. |
| 2015/0175877 A1 | | 6/2015 | Shindgikar et al. |
| 2016/0312141 A1 | | 10/2016 | Rana et al. |
| 2017/0066697 A1 | | 3/2017 | Blotsky et al. |
| 2017/0066977 A1 | | 3/2017 | Rana et al. |
| 2018/0030360 A1 | | 2/2018 | Trevino et al. |
| 2018/0221811 A1 | | 8/2018 | Vorberg et al. |

FOREIGN PATENT DOCUMENTS

| | | |
|---|---|---|
| CN | 1757796 A | 4/2006 |
| CN | 1814595 A | 8/2006 |
| CN | 1309868 C | 4/2007 |
| CN | 101037541 A | 9/2007 |
| CN | 100503595 C | 6/2009 |
| CN | 102993047 A | 3/2013 |
| CN | 103012199 A | 4/2013 |
| CN | 103018237 A | 4/2013 |
| CN | 103691277 A | 4/2014 |
| CN | 102993047 B | 9/2014 |
| CN | 103018237 B | 9/2014 |
| DE | 219030 | 12/1908 |
| DE | 236746 | 11/1910 |
| DE | 1092002 | 11/1960 |
| DE | 2729918 A1 | 1/1979 |
| DE | 3301822 A1 | 8/1983 |
| DE | 3925256 A1 | 1/1991 |
| DE | 19820400 A1 | 11/1999 |
| EP | 0202600 A2 | 11/1986 |
| EP | 411409 A1 | 2/1991 |
| EP | 955342 B1 | 7/2001 |
| EP | 1363985 B1 | 8/2007 |
| EP | 2364768 A1 | 9/2011 |
| GB | 1107057 | 3/1968 |
| GB | 1107244 | 3/1968 |
| GB | 2114144 B | 7/1985 |
| JP | S58129059 A | 8/1983 |
| JP | H01271416 A | 10/1989 |
| JP | H03099038 A | 4/1991 |
| JP | 2000026746 A | 1/2000 |
| JP | 2006219506 A | 8/2006 |
| JP | 2009522406 A | 6/2009 |
| JP | 2011038215 A | 2/2011 |

(56) References Cited

FOREIGN PATENT DOCUMENTS

| | | |
|---|---|---|
| JP | 5441053 B2 | 3/2014 |
| PL | 144233 B1 | 4/1988 |
| RU | 2118649 C1 | 9/1998 |
| RU | 2197605 | 1/2003 |
| RU | 2220756 | 1/2004 |
| RU | 2246342 C1 | 2/2005 |
| RU | 2305123 | 8/2007 |
| RU | 2348679 C2 | 3/2009 |
| RU | 2372341 | 11/2009 |
| RU | 2008122310 A | 12/2009 |
| RU | 2404175 C2 | 11/2010 |
| RU | 2466175 C2 | 11/2010 |
| RU | 2418036 C1 | 5/2011 |
| RU | 2009143509 A | 5/2011 |
| RU | 2470987 C1 | 12/2012 |
| RU | 2490311 C1 | 8/2013 |
| WO | WO 9007467 | 7/1990 |
| WO | WO 98/21521 A1 | 5/1998 |
| WO | WO 02/051968 A1 | 7/2002 |
| WO | WO 2007/078926 A2 | 7/2007 |
| WO | WO 2008/027721 A1 | 3/2008 |
| WO | WO 2008/155333 A1 | 12/2008 |
| WO | WO 2012/086189 A1 | 6/2012 |
| WO | WO 2014/025577 A1 | 2/2014 |
| WO | WO 2016/030262 A1 | 3/2016 |
| WO | WO 2016/100224 A1 | 6/2016 |
| WO | WO 2018/001629 | 1/2018 |
| WO | WO 2018/001630 | 1/2018 |
| WO | WO 2018/001631 | 1/2018 |

OTHER PUBLICATIONS

Al Sasi, Basil Omar et al., "Removal of sulfur from sulfur-bearing natural gas to produce clean jet fuel" Petroleum Science and Technology (2016) 34(17-18): 1550-1555.

Bakke, Jan M., et al., "Hydrogen Sulfide Scavenging by 1,3,5-Triazinanes. Comparison of the Rates of Reaction," Industrial & Engineering Chemistry Research (2004), 43(9):1962-1965.

Benn, M.H., et al., "Cytotoxic Compounds. Part I. p-(N,N-Di-2-chloroethyl)- and p-(N,N-Di-2-bromoethylamino)thiophenol," Journal of the Chemical Society (1958): 2800-2810.

Bennett, E.O., "Corrosion Inhibitors as Preservatives for Metalworking Fluids—Ethanolamines," Lubrication Engineering (1979), 35(3):137-144.

Bradshaw, Jerald S., et al., "Synthesis of Macrocylic Acetals Containing Lipophilic Substituents," Tetrahedron (1987), 43(19):4271-4276.

CAS Registry No. 50-00-0, entered STN: Nov. 16, 1984, 2 pages.
CAS Registry No. 120-07-0, entered STN: Nov. 16, 1984, 2 pages.
CAS Registry No. 3077-12-1, entered STN: Nov. 16, 1984, 2 pages.
CAS Registry No. 30525-89-4, entered STN: Nov. 16, 1984, 2 pages.

Clerici, Angelo, et al., "A New One-Pot, Four-Component Synthesis of 1,2-Amino Alcohols: $TiCl_3$/t-BuOOH-Mediated Radical Hydroxymethylation of Imines," Organic Letters (2008), 10(21): 5063-5066.

European Search Report for European Application No. 16783814.3, 8 pages (dated Oct. 2, 2018).

Friedli, Andrienne C., et al., "A Convenient Synthetic Entry Into Aldehydes With Extended Conjugation" Tetrahedron (1997), 53(18): 2717-2730.

Friedli, Andrienne C., et al., "Corrigendum" Tetrahedron (1997), 53(18): 6233-6234.

Guo, Can-Cheng, et al., "Synthesis of New Aaromatic Aldehydes Bearing Nitrogen Mustard Derivatives and Halogenoalkylpiperazinyl," Chinese Journal of Organic Chemistry (2005), 25(3): 308-312.

International Search Report and Written Opinion for International Application No. PCT/US2014/013818, 9 pages (dated May 28, 2014).

International Search Report and Written Opinion from related PCT App. No. PCT/US2016/028534, dated Jun. 30, 2016 (12 pages).

International Search Report and Written Opinion for International Application No. PCT/US2016/046813, 10 pages (dated Nov. 23, 2016).

International Search Report and Written Opinion for International Application No. PCT/US2016/046832, 9 pages (dated Nov. 23, 2016).

International Search Report and Written Opinion for International Application No. PCT/US2017/044099, 11 pages (dated Oct. 26, 2017).

International Preliminary Report on Patentability for International Application No. PCT/US2016/046813, 7 pages (dated Mar. 22, 2018).

International Search Report and Written Opinion for International Application No. PCT/US2018/041758, 11 pages (dated Sep. 28, 2018).

Kozyukov, V.P., et al., Journal of General Chemistry of the USSR, Translated from Russian. New York: Consultants Bureau, 1982, pp. 1222-1229.

Kreulen, H., et al., "Selective removal of $H_2S$ from sour gases with microporous membranes. Part II. A liquid membrane of water-free tertiary amines," Journal of Membrane Science (1993), 82: 85-197.

Li, Fangzheng, et al., "Synthesis of γ-N-Arylideneaminopropyl-2-Methyl-6-Phenyl-1,3-Dioxa-6-AZA-2-Silacyclooctanes," Synthetic Communications (2001), 31(23): 3715-3720.

Ma, Hong, et al., "A Novel Synthesis of Side-Chain Electro-Optic Polyimides With High AZO Chromophore Density," European Polymer Journal (1998), 34(8):1125-1132.

Mandal, B.P. et al, "Selective absorption of $H_2S$ from gas streams containing $H_2S$ and $CO_2$ into aqueous solutions of N-methyldiethanolamine and 2-amino-2-methyl-1-propanol" Separation and Purification Technology (2004) 35: 191-202.

Mandal, B.P. et al, "Simultaneous absorption of carbon dioxide and hydrogen sulfide into aqueous blends of 2-amino-2-methyl-1-propanol and diethanolamine" Chemical Engineering Science (2005) 60: 6438-6451.

Massin, Julien, et al., "Near-Infrared Solid-State Emitters Based on Isophorone: Synthesis, Crystal Structure and Spectroscopic Properties," Chemistry of Materials (2011), 23(3): 862-873.

Nishiyama, Tomihiro, et al., "Synthesis and Spectra Behavior of 6-Phenyl-5,6,7,8-tetrahydro-4H-1,3,6-dioxazocines Using NMR," Journal of Heterocyclic Chemistry (1986), 23: 69-71.

Pudovik, et al. Journal of General Chemistry of the USSR, Translated from Russian. New York: Consultants Bureau, 1990, pp. 407-408.

Riesenfeld, F.C. et al., "Tertiary ethanolamines more economical for removal of $H_2S$ and carbon dioxide" Oil & Gas Journal (1986) 61-65.

Shen, Shigang, et al., "Mechanistic study of the oxidation of N-phenyldiethanolamine by bis(hydrogen periodato)argentate(III) complex anion," Transition Metal Chemistry (2007), 32:167-171.

STN Search dated Mar. 4, 2016, 60 pages.
STN search dated Mar. 6, 2018, 3 pages.
STN Search dated Aug. 29, 2018, 23 pages.

"Sul-free H2S & Acid Gas Eliminator," 6 pages, undated, but to the best of undersigned attorney's belief and knowledge it is believed to be prior to the filing date of this application.

Yin, Dong-Dong., et al., "Synthesis of a Novel Organic Nonlinear Optical Molecule MC-FTC," Acta Chimica Sinica (2004), 62(5): 518-522.

Zhao, Yunzhou, et al., "A highly selective colorimetric chemodosimeter for fast and quantitative detection of hydrogen sulfide," Analyst (2012), 137: 5576-5580.

Zhou, Limin, et al., "NLO Polymers Containing Anionic Chromophore," Journal of Macromolecular Science, Part A: Pure and Applied Chemistry (2005), 42:1423-1434.

Zhou, Limin, et al., "Novel Crosslinked Nonlinear Optical Materials Based on Cellulose Diacetate," Journal of Applied Polymer Science (2006), 100: 2832-2837.

Unknown, "Naval Research Laboratory" Naval Research Laboratory, Jan. 1, 1900, pp. 29-30.

(56) References Cited

OTHER PUBLICATIONS

Walker, J. Frederic, "Formaldehyde" Reinhold Publishing Corporation, 1964, Ed. Third Edition; p. 264.
PCT International Search and Written Opinion for PCT/US2020/014344, dated Apr. 22, 2020, 11 pages.

* cited by examiner

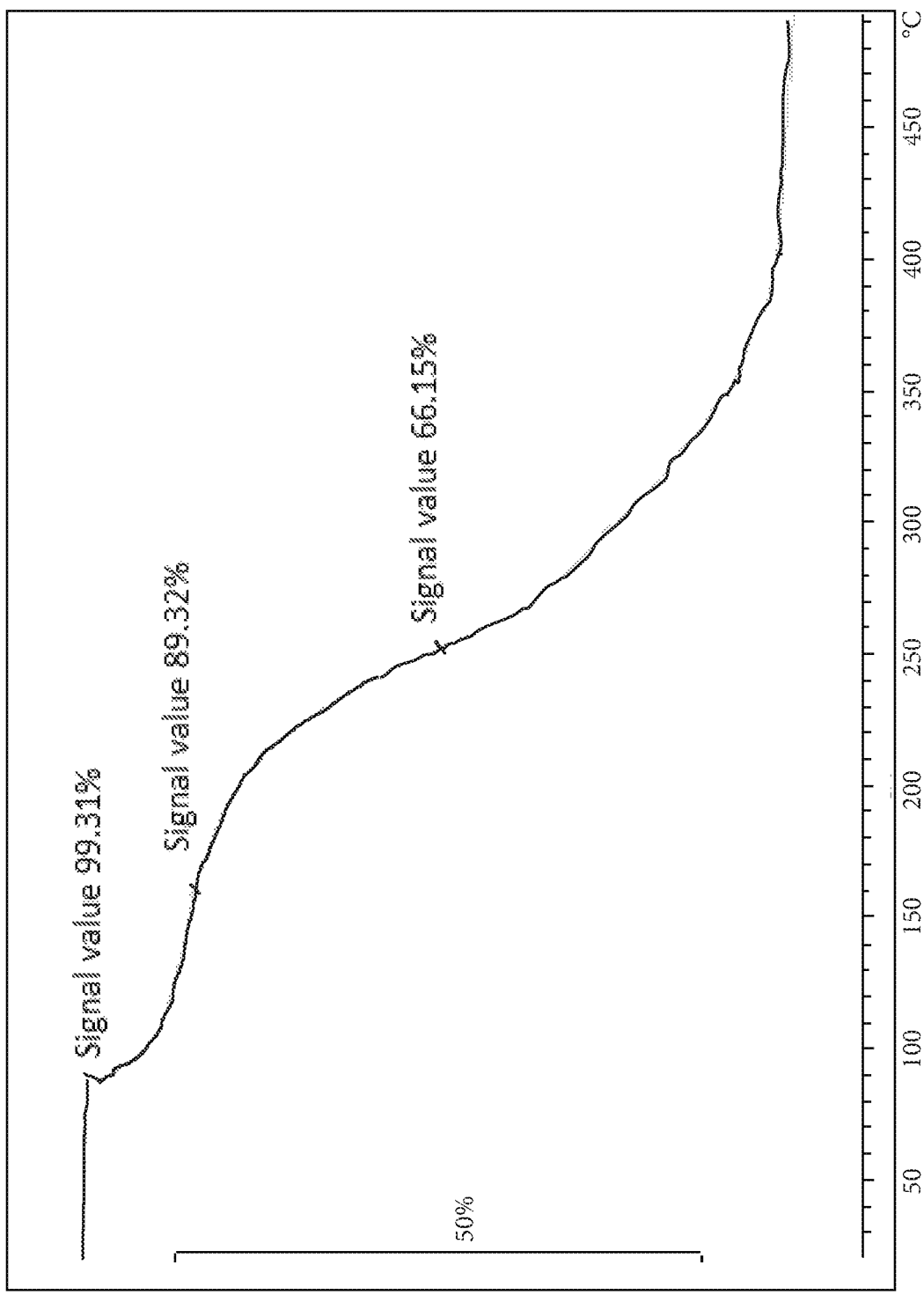

DEVELOPMENT OF A NOVEL HIGH TEMPERATURE STABLE SCAVENGER FOR REMOVAL OF HYDROGEN SULFIDE

BACKGROUND

1. Field of the Invention

The present disclosure generally relates to removal of contaminants in liquid and gaseous streams. More particularly, the disclosure relates to hydrogen sulfide scavengers for liquid and gaseous streams.

2. Description of the Related Art

Hydrogen sulfide is very toxic and poses challenges in the oil and gas industry. The removal of hydrogen sulfide from liquid or gaseous hydrocarbon streams is also a problem that poses certain safety risks. Many issues associated with hydrogen sulfide are present in drilling, production, transportation, storage, and processing of crude oil and waste water associated with crude oil. Similar issues arise during the production of natural gas.

The presence of sulfur-containing compounds may result in the deposition of sulfur containing salts, which can cause plugging and corrosion of transmission pipes, valves, regulators, etc. Even flared natural gas needs to be treated to avoid acid rain causing $SO_2$ formation. Further, in the manufactured gas industry or coke making industry, coal-gas containing unacceptable levels of hydrogen sulfide is commonly produced from destructive distillation of bituminous coal.

Since hydrogen sulfide has an offensive odor and natural gas containing hydrogen sulfide is referred to as "sour" gas, treatments to lower hydrogen sulfide content are generally referred to as "sweetening" treatments.

BRIEF SUMMARY

Certain aspects of the present disclosure relate to compositions and methods for treating hydrogen sulfide. In one embodiment, a method of treating hydrogen sulfide in a stream is disclosed. The method comprises adding a composition to a stream comprising an amount of hydrogen sulfide, wherein the composition comprises one or more scavenger compounds having the following general formula:

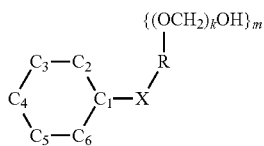

wherein the $C_1$-$C_6$ ring structure may be aromatic or cyclic aliphatic;
$C_1$-$C_6$ may be independently selected from carbon, nitrogen, oxygen, and sulfur, wherein $C_2$ may be present or absent and, if absent, the ring structure is a five-membered ring structure;
wherein the ring structure may be substituted with an electron withdrawing group or an electron donating group;
X may be selected from the group consisting of carbon, nitrogen, oxygen, sulfur, a carbonyl group, an alkyl group, and an alkenyl group;
R may be selected from the group consisting of hydrogen, an alkyl group, an alkenyl group, an alkynyl group, nitrogen and oxygen, wherein the alkyl group, alkenyl group and the alkynyl group may be unsubstituted or substituted;
k is an integer selected from 0 to 25; and
m is an integer selected from 1 to 4.

In another embodiment, a method of treating hydrogen sulfide in a stream is disclosed. The method comprises adding a composition to a stream comprising an amount of hydrogen sulfide, wherein the composition comprises one or more scavenger compounds having the following general formula:

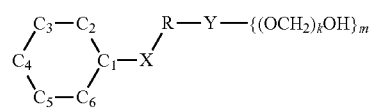

wherein the $C_1$-$C_6$ ring structure may be aromatic or cyclic aliphatic; $C_1$-$C_6$ may be independently selected from carbon, nitrogen, oxygen, and sulfur, wherein $C_2$ may be present or absent and, if absent, the ring structure is a five-membered ring structure; wherein the ring structure may be substituted with an electron withdrawing group or an electron donating group; X may be selected from the group consisting of N(NH), (NCH$_2$OH), and O; R may be selected from the group consisting of a $C_2$-$C_8$ linear or branched alkyl group, a $C_2$-$C_8$ linear or branched alkenyl group, and a $C_2$-$C_8$ linear or branched alkynyl group; Y is nitrogen or oxygen; k is an integer selected from 0 to 25; and m is an integer selected from 1 to 4.

In a further embodiment, a method of treating hydrogen sulfide in a stream is disclosed. The method comprises adding a composition to a stream comprising an amount of hydrogen sulfide, wherein the composition comprises one or more scavenger compounds having the following general formula:

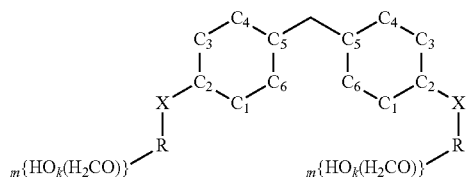

wherein each $C_1$-$C_6$ ring structure may be aromatic or cyclic aliphatic; $C_1$-$C_6$ may be independently selected from carbon, nitrogen, oxygen, and sulfur, wherein $C_6$ may be present or absent and, if absent, the ring structure is a five-membered ring structure; wherein the ring structure may be substituted with an electron withdrawing group or an electron donating group;
each X is independently selected from the group consisting of N, NH, and O; each R is independently selected from the group consisting of O, a $C_1$-$C_8$ linear or branched alkyl group, a $C_1$-$C_8$ linear or branched alkenyl group, and a $C_1$-$C_8$ linear or branched alkynyl group; each k is an integer selected from 0 to 25; and each m is an integer selected from 1 to 4.

In an additional embodiment, a method of treating hydrogen sulfide in a stream is disclosed. The method comprises adding a composition to a stream comprising an amount of hydrogen sulfide, wherein the composition comprises one or more scavenger compounds having the following general formula:

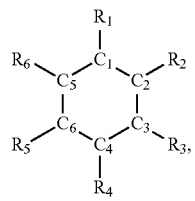

wherein $C_1$-$C_6$ are independently selected from the group consisting of carbon, nitrogen, oxygen, and sulfur; $R_1$-$R_6$ are independently selected from the group consisting of hydrogen, X—(CH$_2$)n-Y—(CH$_2$)n-H and

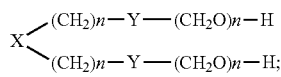

X is selected from the group consisting of carbon, nitrogen, oxygen, and sulfur; Y is selected from the group consisting of nitrogen, oxygen, and sulfur; and n is a number in a range of 0-6.

In another embodiment, a method of treating hydrogen sulfide in a stream is disclosed. The method comprises adding a composition to a stream comprising an amount of hydrogen sulfide, wherein the composition comprises one or more scavenger compounds having the following general formula:

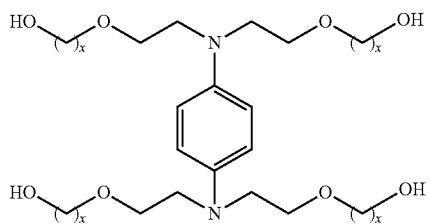

wherein "x" is any number, or any range of numbers, between 0 and about 25, such as from about 1 to about 5, from about 6 to about 15, or from about 16 to about 25. Although the second nitrogen-containing substituent is shown in the para position, it may also be located in the ortho and/or meta positions.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 shows data received from a thermal gravimetric analysis of one of the presently disclosed scavengers.

DETAILED DESCRIPTION

Various embodiments are described below. The relationship and functioning of the various elements of the embodiments may better be understood by reference to the following detailed description. However, embodiments are not limited to those explicitly described below. It is noted that in certain instances, details may have been omitted that are not necessary for an understanding of embodiments disclosed herein, such as conventional fabrication and assembly.

The present disclosure provides compositions and methods that are useful in removing, lowering the amount of, or otherwise controlling hydrogen sulfide and mercaptans. The compositions and methods can be used in any industry where hydrogen sulfide poses problems, such as when dealing with crude oil based, natural gas based, and/or coal based products. The present disclosure provides compositions and methods that can reduce the amount of or eliminate hydrogen sulfide in a variety of mediums. Hereinafter, it is to be understood that the term "treating" in connection with the phrase, for example, "treating hydrogen sulfide" is to be construed as meaning removing, lowering, reducing, and/or eliminating hydrogen sulfide.

For example, in one aspect, a method of treating hydrogen sulfide may encompass completely eliminating hydrogen sulfide from a hydrocarbon stream. In another aspect, a method of treating hydrogen sulfide may encompass reducing or lowering the hydrogen sulfide content in a hydrocarbon stream.

In some embodiments, the present disclosure relates to chemical compositions that are capable of treating hydrogen sulfide. Such compositions may be generally referred to as scavengers. The scavengers can effectively treat hydrogen sulfide in liquid or gaseous streams in any environment. In some embodiments, the scavengers are anhydrous. The anhydrous scavengers may be blended with nonaqueous solvents, such as hydrocarbon solvents, to produce a composition that can be used in any environment or climate. The anhydrous compositions can optionally be blended with hydrophilic solvents (e.g., alcohols, glycol, polyols) for nonaqueous applications. Alternatively, the compositions may be blended with an aqueous phase for direct use in aqueous applications. In some embodiments, the scavengers may be oil soluble. In some embodiments, the compositions exclude triazine compounds. In certain embodiments, the compositions do not create uncontrollable emulsions, meaning they do not have a negative effect on the oil/water separation of the produced fluids and water quality. Additionally, in certain aspects, the presently disclosed molecules can be used as corrosion inhibitors and/or scale inhibitors.

In some embodiments, the compositions comprise one or more scavenger compounds of the following general formula:

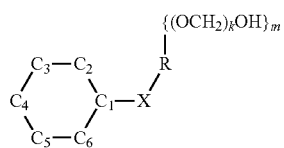

The six-membered ring may be aromatic or cyclic aliphatic. In some embodiments, the ring may only include $C_1$-$C_5$, such that the ring is a five-membered ring. $C_1$-$C_6$ may be independently selected from carbon, nitrogen, oxygen and sulfur. $C_2$-$C_4$ may be independently selected from the group: X—R—{(OCH$_2$)$_k$OH}m. The ring, whether it be a five or six-membered ring, may be substituted with electron withdrawing groups, such as CHO, CN, COOH, C(O)R$_1$ (wherein R$_1$ may be, for example, an alkyl group), NO$_2$, Cl, I, etc., and/or it may be substituted with electron donating groups, such as amines, substituted amines, alcohols, ethers, alkyl groups, phenyl groups, alkenyl groups, alkenyl amide groups, etc. "X" may be selected from carbon, nitrogen, oxygen, sulfur, carbonyl, alkyl, and alkenyl. "R" may be selected from hydrogen, alkyl, alkenyl, alkynyl, nitrogen or oxygen, unsubstituted or substituted with one or more suitable substituents. "k" is an integer selected from 0 to 25 and m is an integer selected from 1 to 4.

In some embodiments, the six-membered ring is an aromatic ring, X=N(NH), R=$C_1$-$C_8$ alkyl, and k+m=18. In at least one embodiment, the six-membered ring is aromatic, X=NCH$_2$OH, R=$C_1$-$C_8$ alkyl, and k+m=7. In other embodiments, a scavenger compound comprises the formula:

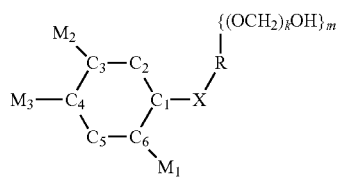

wherein the six-membered ring (or five-membered ring in some embodiments) is aromatic or acyclic and $M_1$-$M_3$ are independently selected from linear or branched alkyl, alkenyl, alkynyl groups, CHO, CN, COOH, C(O)R$_1$ (wherein R$_1$ may be, for example, an alkyl group), NO$_2$, Cl, I, amines, substituted amines, alcohols, ethers, alkyl groups, phenyl groups, alkenyl groups, and alkenyl amide groups, in the ortho-, para- or meta-position of the ring, X=N, and R=CO or linear or branched C1-C8 alkyl, alkenyl, or alkynyl. $C_1$-$C_6$ may be independently selected from carbon, nitrogen, oxygen and sulfur, "k" is an integer selected from 0 to 25, and m is an integer selected from 1 to 4.

In other embodiments, the scavenger compound comprises the following general formula:

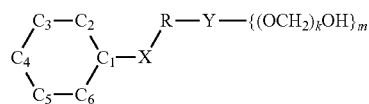

wherein the $C_1$-$C_6$ ring structure may be aromatic or acyclic, X=N(NH), (NCH2OH), or O, R=$C_2$-$C_8$ alkyl, alkenyl, or alkynyl, which may be branched or linear, and Y=N or O. In some embodiments, the ring may only include $C_1$-$C_5$, such that the ring is a five-membered ring. $C_1$-$C_6$ may be independently selected from carbon, nitrogen, oxygen and sulfur. The ring, whether it be a five or six-membered ring, may be substituted with electron withdrawing groups, such as CHO, CN, COOH, C(O)R$_1$ (wherein R$_1$ may be, for example, an alkyl group), NO$_2$, Cl, I, etc., and/or it may be substituted with electron donating groups, such as amines, substituted amines, alcohols, ethers, alkyl groups, phenyl groups, alkenyl groups, alkenyl amide groups, etc., "k" is an integer selected from 0 to 25, and m is an integer selected from 1 to 4.

In other embodiments, the scavenger compound may comprise the following generic structure:

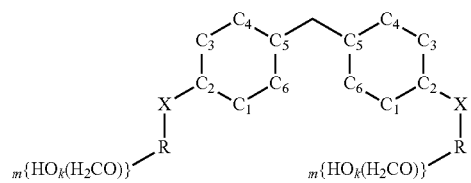

wherein each $C_1$-$C_6$ ring structure may be aromatic or acyclic, each X is independently selected from N, NH, or O, and each R is independently selected from O or $C_1$-$C_8$ alkyl, alkenyl, or alkynyl, which may be branched or linear. $C_1$-$C_6$ may be independently selected from carbon, nitrogen, oxygen and sulfur, "k" is an integer selected from 0 to 25, and m is an integer selected from 1 to 4. In some embodiments, one or both of the rings may only include $C_1$-$C_5$, such that the ring is a five-membered ring. The rings, whether they be five or six-membered rings, may be substituted with electron withdrawing groups, such as CHO, CN, COOH, C(O)R$_1$ (wherein R$_1$ may be, for example, an alkyl group), NO$_2$, Cl, I, etc., and/or it may be substituted with electron donating groups, such as amines, substituted amines, alcohols, ethers, alkyl groups, phenyl groups, alkenyl groups, alkenyl amide groups, etc.

In some embodiments, the compositions comprise one or more scavengers of the following general formula:

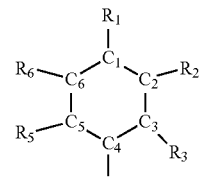

C1-C6 = C, N, O or S
C1-C6 = CH2, CH

R1-R6 =

1. X—(CH$_2$)$n$—Y—(CH$_2$O)$n$—H n = 0-6

2. X$\diagup$(CH$_2$)$n$—Y—(CH$_2$O)$n$—H
     $\diagdown$(CH$_2$)$n$—Y—(CH$_2$O)$n$—H

X = N, O, C, S
Y = O, N, S

Although the 6-membered ring is shown as non-aromatic above, in some embodiments, it may be aromatic meaning it comprises three double bonds. As opposed to being aromatic, the 6-membered ring may also comprise, for example, one or two double bonds. Moreover, in the structure above, any one of $R_1$ to $R_6$ may be hydrogen. Also, more than one of $R_1$ to $R_6$ may be hydrogen. For example, $R_1$ to $R_5$ may be hydrogen. Additionally, a scavenger compound can include a dimer and/or trimer of the above general structure.

In some embodiments, the scavenger compounds are selected from the group consisting of:

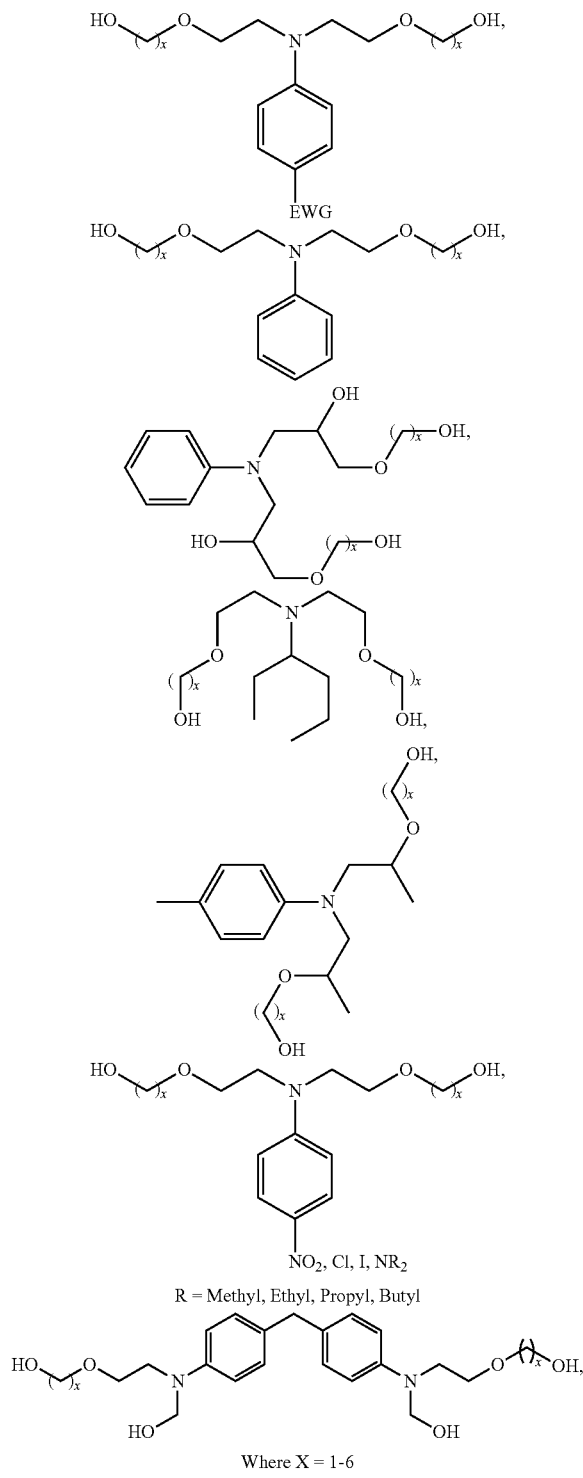

Where X = 1-6

A composition can include any of the foregoing scavenger compounds or any combination of the foregoing scavenger compounds in addition to other hemiformal compounds. In the foregoing compounds, "EWG" denotes an electron withdrawing group. Any electron withdrawing group may be used, such as CHO, CN, and $C(O)CH_3$. In some embodiments, a composition may include any number of the above-noted structures in a variety of ratios. For example, a composition may include any three of the above-noted structures in a ratio of about 30:20:20. The composition may also include any of the solvents disclosed herein.

In certain embodiments, the presently disclosed scavenger compounds may be produced by reacting a cycloaliphatic amine with a formaldehyde solution or paraformaldehyde. In other embodiments, these compounds may be produced by, for example, reacting cycloaliphatic amines with ethylene oxide (EO), propylene oxide (PO), and/or glycidol to produce a reaction product and subsequently reacting the reaction product with paraformaldehyde or a fomaldehyde solution (e.g. formalin).

In some embodiments, the compositions comprising one or more scavenger compounds are added to liquid or gaseous streams neat (or active), meaning the compositions do not comprise a solvent or the compositions consist essentially of one or more scavengers, meaning that they exclude solvents. In other embodiments, the compositions may comprise solvents. In some embodiments, the solvents include one or more of isopropanol, methanol, toluene, water, xylene, ethylene glycols, and propylene glycols. In some embodiments, the solvent(s) comprise about 50% by weight of one or more scavenger compounds, although in other embodiments the solvent may comprise from about 10% to about 99%, such as from about 30% to about 70%, by weight, of one or more scavenger compounds.

These scavengers are thermally stable at high temperatures ranging from about 150° C. up to about 200° C. and they maintain their hydrogen sulfide scavenging capabilities even at these high temperatures. These scavengers also have a low scaling potential, contain low amounts of nitrogen, or no nitrogen at all, and are non-corrosive. In some aspects, the presently disclosed scavengers may be used as corrosion inhibitors.

In one embodiment, a composition of the present disclosure comprises the following scavenger:

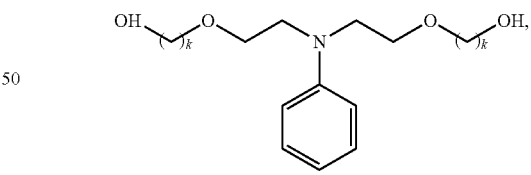

wherein "k" = 1-10.

The foregoing scavenger may be produced according to the following synthetic scheme, wherein $C_1$-$C_6$, X, R, k, and m are defined as above, and n=1-100:

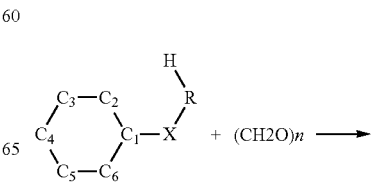

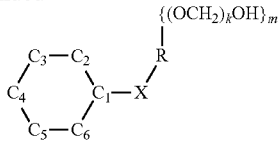

Generally, N-Phenyldiethanolamine, or any of the amines disclosed in the following paragraphs, may be reacted with about 1-3 moles of paraformaldehyde (or a formaldehyde solution containing from about 10% to about 90% formaldehyde in water) to produce a scavenger according to the present disclosure. In some embodiments, the amine may be reacted with about 1 mole to about 3 moles of paraformaldehyde to produce the scavenger.

In one embodiment, about 1 to about 2 moles of solid N-phenyldiethanolamine may be melted at about 70° C. to obtain a liquid. The liquid may be added to a reaction flask equipped with a magnetic stirrer, a nitrogen inlet, and a temperature probe. Heat may be applied to heat the contents to about 80° C. Nitrogen can be swept over the reaction mixture throughout the entire reaction. About 0.001 to about 0.035 moles of a potassium hydroxide (KOH) solution may then be added to the reaction flask and the reaction may be stirred at 80° C. for about 20 min. About 1 to about 2 moles of solid paraformaldehyde prills may then be added to the reaction mixture batch-wise using, for example, a solid addition funnel. In some embodiments, the paraformaldehyde is added at a rate of about 5 to 10 grams every 10 minutes. After all paraformaldehyde has been added, the reaction mixture may be heated for about 2 to 4 hours at 80° C. to produce the desired scavenger compound. In this particular embodiment, the scavenger had a pH of about 7.6 and a viscosity at 75° F. of about 2000.

While N-Phenyldiethanolamine is depicted as a starting material in the above synthetic scheme, the starting material is not limited to this amine and many other amines may be used. Illustrative, non-limiting examples of suitable amines include, but are not limited to, aniline, substituted aniline, cyclohexylamine, aromatic alkanolamines, and cycloaliphatic alkanolamines.

Any of the foregoing amines may be used and any of the ethoxylated, propoxylated, and/or alkoxylated derivatives of these amines may be used. Also, the N-phenyldiethanolamine can be reacted with ethylene oxide, propylene oxide, glycidol, or an epoxide.

The compositions of the present disclosure include one or more scavengers as defined herein. The compositions may also optionally include one or more additives. Suitable additives include, but are not limited to, asphaltene inhibitors, paraffin inhibitors, corrosion inhibitors, scale inhibitors, emulsifiers, water clarifiers, dispersants, emulsion breakers, additional hydrogen sulfide scavengers, gas hydrate inhibitors, biocides, pH modifiers, surfactants, solvents, and any combination thereof.

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, polyisobutylene succinic anhydride, and any combination thereof.

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes, and combinations thereof. Suitable dispersants include, but are not limited to, dodecyl benzene sulfonate, oxyalkylated alkylphenols, oxyalkylated alkylphenolic resins, and any combination thereof.

Suitable corrosion inhibitors include, but are not limited to, amidoamines, quaternary amines, amides, phosphate esters, and any combination thereof.

Suitable scale inhibitors include, but are not limited to, phosphates, phosphate esters, phosphoric acids, phosphonates, phosphonic acids, polyacrylam ides, salts of acrylamido-methyl propane sulfonate/acrylic acid copolymer (AMPS/AA), phosphinated maleic copolymer (PHOS/MA), salts of a polymaleic acid/acrylic acid/acrylamido-methyl propane sulfonate terpolymer (PMA/AMPS), and any combination thereof.

Suitable emulsifiers include, but are not limited to, salts of carboxylic acids, products of acylation reactions between carboxylic acids or carboxylic anhydrides and amines, alkyl, acyl and amide derivatives of saccharides (alkyl-saccharide emulsifiers), and any combination thereof.

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, cationic polymers such as diallyldimethylammonium chloride (DADMAC), and any combination thereof.

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives, and any combination thereof.

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, resins such as phenolic and epoxide resins, and any combination thereof.

Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, monomethylamine triazine, and triazines from multiple amines or mixtures thereof), glyoxal, and any combination thereof.

Suitable gas hydrate inhibitors include, but are not limited to, thermodynamic hydrate inhibitors (THI), kinetic hydrate inhibitors (KHI), anti-agglomerates (AA), and any combination thereof. Suitable thermodynamic hydrate inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), alkyl or cyclic esters of alcohols (such as ethyl lactate, butyl lactate, methylethyl benzoate), and any combination thereof. Suitable kinetic hydrate inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, proteins, and any combination thereof.

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), quaternary phosphonium salts (e.g., tetrakis(hydroxymethyl)phosphonium sulfate (THPS)), and combinations thereof. Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxides, and any combination thereof.

Suitable pH modifiers include, but are not limited to, alkali hydroxides, alkali carbonates, low pH tertiary amines, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

Suitable surfactants include, but are not limited to, anionic surfactants, cationic surfactants, nonionic surfactants, and combinations thereof. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates, and combinations thereof. Cationic surfactants include alkyl trimethyl quaternary ammonium salts, alkyl dimethyl benzyl quaternary ammonium salts, dialkyl dimethyl quaternary ammonium salts, imidazolinium salts, and combinations thereof. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters, and combinations thereof. Also included are betaines and sultanes, amphoteric surfactants such as alkyl amphoacetates and amphodiacetates, alkyl amphopropripionates and amphodipropionates, alkyliminodiprionate, and combinations thereof.

In certain embodiments, the surfactant may be a quaternary ammonium compound, an amine oxide, an ionic or non-ionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecyl-benzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl) dimethyl quaternary ammonium methyl sulfate.

Suitable solvents include, but are not limited to, water, isopropanol, methanol, ethanol, 2-ethylhexanol, heavy aromatic naphtha, toluene, ethylene glycol, ethylene glycol monobutyl ether (EGMBE), diethylene glycol monoethyl ether, xylene, and combinations thereof. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative of non-polar solvents suitable for formulation with the composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like.

In some embodiments, the solvent is a polyhydroxylated solvent, a polyether, an alcohol, or a combination thereof.

In certain embodiments, the solvent is monoethyleneglycol, methanol, dimethyl sulfoxide (DMSO), dimethylformamide (DMF), tetrahydrofuran (THF), or a combination thereof.

In some embodiments, a composition of the present disclosure may comprise one or more scavengers, optionally one or more additives, and from 0 to about 80% by weight of one or more solvents, based on the weight of the composition. In certain embodiments, a composition of the present disclosure may comprise from 0 to about 50% by weight of one or more solvents, based on the weight of the composition. In some embodiments, the composition may comprise from about 20% to about 50% by weight of one or more solvents, based on the weight of the composition.

The presently disclosed compositions comprising one or more hydrogen sulfide scavengers may be used to treat hydrogen sulfide in any industrial application where the treatment of hydrogen sulfide is desirable. For example, when working with crude oil based products, natural gas based products, and/or coal based products, hydrogen sulfide will generally pose certain problems and the presently disclosed scavengers may be used to eliminate or significantly mitigate such problems.

The compositions may be used for sweetening a gas or liquid, such as a sour gas or a sour liquid. The compositions may be used for scavenging hydrogen sulfide from a gas or liquid stream by treating said stream with an effective amount of a composition comprising a scavenger, as described herein. The compositions can be used in any industry where it is desirable to capture hydrogen sulfide from a gas or liquid stream. In certain embodiments, the compositions may be used in water systems, condensate/oil systems/gas systems, or any combination thereof.

In certain embodiments, the compositions can be applied to a gas or liquid produced or used in the production, transportation, storage, and/or separation of crude oil or natural gas. In certain embodiments, the compositions can be applied to a gas stream used or produced in a coal-fired process, such as a coal-fired power plant. In certain embodiments, the compositions can be applied to a gas or liquid produced or used in a waste-water process, a farm, a slaughter house, a land-fill, a municipality waste-water plant, a coking coal process, the healthcare industry, pest elimination, a mining operation, a pulp and paper facility, or a biofuel process.

The compositions may be added to any fluid or gas containing hydrogen sulfide or a fluid or gas that may be exposed to hydrogen sulfide. A fluid to which the compositions may be introduced may be an aqueous medium. The aqueous medium may comprise water, gas, and/or liquid hydrocarbon. A fluid to which the compositions are introduced may be a liquid hydrocarbon. The liquid hydrocarbon may be any type of liquid hydrocarbon including, but not limited to, crude oil, heavy oil, processed residual oil, bitminous oil, coker oils, coker gas oils, fluid catalytic cracker feeds, gas oil, naphtha, fluid catalytic cracking slurry, diesel fuel, fuel oil, jet fuel, gasoline, and kerosene. In certain embodiments, the gas may be a sour gas. In certain embodiments, the fluid or gas may be a refined hydrocarbon product.

A fluid or gas treated with a composition of the present disclosure may be at any selected temperature, such as ambient temperature, a temperature lower than ambient temperature, or a temperature elevated above ambient temperature. In certain embodiments, the fluid (e.g., liquid hydrocarbon) or gas may be at a temperature of from about 40° C. to about 250° C. In certain embodiments, the fluid or gas may be at a temperature of from −50° C. to 300° C.

The fluid or gas in which the compositions are introduced may be contained in and/or exposed to many different types of apparatuses. For example, the fluid or gas may be contained in an apparatus that transports fluid or gas from one point to another, such as an oil and/or gas pipeline. In certain embodiments, the apparatus may be part of an oil and/or gas refinery, such as a pipeline, a separation vessel, a dehydration unit, or a gas line. The fluid may be contained in and/or exposed to an apparatus used in oil extraction and/or production, such as a wellhead. The apparatus may be part of a coal-fired power plant. The apparatus may be a scrubber (e.g., a wet flue gas desulfurizer, a spray dry absorber, a dry sorbent injector, a spray tower, a contact or bubble tower, or the like). The apparatus may be a cargo vessel, a storage vessel, a holding tank, or a pipeline connecting the tanks, vessels, or processing units. In certain embodiments, the fluid or gas may be contained in water systems, condensate/oil systems/gas systems, or any combination thereof.

The compositions may be introduced into a fluid or gas by any appropriate method for ensuring dispersal of the scavenger through the fluid or gas. The compositions may be injected using mechanical equipment such as chemical injection pumps, piping tees, injection fittings, atomizers, quills, and the like. The compositions may be introduced with or without one or more additional polar or non-polar solvents depending upon the application and requirements. In certain embodiments, the compositions may be pumped into an oil and/or gas pipeline using an umbilical line. In some embodiments, capillary injection systems can be used to deliver the compositions to a selected fluid. In particular embodiments, the compositions can be introduced into a liquid and mixed. The compositions can be injected into a gas stream as an aqueous or nonaqueous solution, mixture, or slurry. In some embodiments, the fluid or gas may be passed through an absorption tower comprising a composition as disclosed herein.

The compositions may be applied to a fluid or gas to provide a scavenger concentration of about 1 parts per million (ppm) to about 1,000,000 ppm, about 1 parts per million (ppm) to about 100,000 ppm, about 10 ppm to about 75,000 ppm, about 100 ppm to about 45,000 ppm, about 500 ppm to about 40,000 ppm, about 1,000 ppm to about 35,000 ppm, about 3,000 ppm to about 30,000 ppm, about 4,000 ppm to about 25,000 ppm, about 5,000 ppm to about 20,000 ppm, about 6,000 ppm to about 15,000 ppm, or about 7,000 ppm to about 10,000 ppm.

Each particular system or application has its own requirements and thus the compositions comprising the scavengers may be applied at any effective dosage that can be selected by one having ordinary skill in the art depending upon the particular application and the relevant factors associated with that application. For example, a really sour gas (e.g., containing large quantities of hydrogen sulfide) may require a higher dose rate. In certain embodiments, the compositions may be applied to a fluid or gas in an equimolar amount or greater relative to hydrogen sulfide present in the fluid or gas.

The hydrogen sulfide in a fluid or gas may be reduced by any amount by treatment with a composition of the present disclosure. The actual amount of residual hydrogen sulfide after treatment may vary depending on the starting amount. In certain embodiments, the hydrogen sulfide may be completely eliminated from the fluid or gas or it may be reduced to levels of about 150 ppm by volume or less, as measured in the vapor phase, based on the volume of the liquid media.

In some embodiments, the compositions of the present disclosure may be soluble in an aqueous phase such that the captured sulfur-based species (e.g. hydrogen sulfide) will migrate into the aqueous phase. If an emulsion is present, the captured sulfur-based species can be migrated into the aqueous phase from a hydrocarbon phase (e.g., crude oil) and removed with the aqueous phase. If no emulsion is present, a water wash can be added to attract the captured sulfur-based species. In certain embodiments, the compositions can be added before a hydrocarbon (e.g., crude oil) is treated in a desalter, which emulsifies the hydrocarbon media with a water wash to extract water soluble contaminants and separates and removes the water phase from the hydrocarbon.

Optionally, demulsifiers may be added to aid in separating water from the hydrocarbon. In certain embodiments, the demulsifiers include, but are not limited to, oxyalkylated organic compounds, anionic surfactants, nonionic surfactants or mixtures of these materials. The oxyalkylated organic compounds include, but are not limited to, phenol-formaldehyde resin ethoxylates and alkoxylated polyols. The anionic surfactants include alkyl or aryl sulfonates, such as dodecylbenzenesulfonate. These demulsifiers may be added in amounts to contact the water from about 1 to about 1000 ppm by weight based on the weight of the hydrocarbon.

EXAMPLES

The following example demonstrates the hydrogen sulfide scavenging capabilities of certain presently disclosed scavengers.

A composition comprising the scavenger:

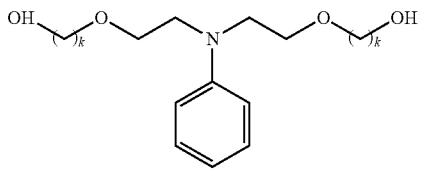

was evaluated for performance by measuring hydrogen sulfide reduction in the vapor phase. The evaluation was based on an optimized version of the ASTMD5705 test method and is designed for the determination of hydrogen sulfide reduction in the vapor phase. The procedure allows for the measurement of hydrogen sulfide in the vapor phase from a sample of a sour fluid by using gas detection tubes in a controlled environment.

A sample of the $H_2S$ scavenger (where "k"=1) was placed in a sour medium and allowed to react for a specific duration in a heated mixing state. The fluid medium comprised 50:50 Crude:Synthetic Brine. The synthetic brine comprised a low TDS and high TDS composition. Low TDS may comprise from 0 up to about 10,000 and high TDS may comprise from greater than about 10,000 to about 20,000. The fluid medium was purged with hydrogen sulfide to represent a sour medium. The dosage relates to a ratio of scavenger ppm to $H_2S$ ppm measured in the liquid. Traditional full well stream dosages of 20:1 and 30:1 were applied. Hydrogen sulfide was measured in the vapor phase before (blank) and after scavenger dosage. Both the neat/active (without solvent) and the thermally exposed samples were evaluated for performance. $H_2S$ scavenger samples were thermally exposed at 200° C. for 7 days. The tests were run at a temperature of about 80° C. for about 1 hour. Results of the tests are shown below in Table 1.

TABLE 1

| Final Product | Brine TDS | Dosage Ratio Chemical ppm:$H_2S$ ppm liquid | $H_2S$ Initial Vapor (ppm) | $H_2S$ Final Vapor (ppm) | Reduction Initial vs. Final (%) |
|---|---|---|---|---|---|
| Neat | Low | 20:1 | 12500 | 0 | 100 |
| Neat | Low | 30:1 | 12500 | 0 | 100 |
| Neat | High | 20:1 | 12500 | 50 | 100 |
| Neat | High | 30:1 | 12500 | 25 | 100 |
| Thermally Exposed | Low | 20:1 | 12500 | 1100 | 91 |
| Thermally Exposed | Low | 30:1 | 12500 | 140 | 99 |
| Thermally Exposed | High | 20:1 | 12500 | 1800 | 86 |
| Thermally Exposed | High | 30:1 | 12500 | 1000 | 92 |

The results in Table 1 demonstrate that the scavenger is able to reduce the hydrogen sulfide content from 12500 ppm to 0 ppm providing 100% reduction with both high TDS and low TDS brines represented in the fluid medium. It was observed that hydrogen sulfide final vapor content for the neat samples in high TDS brines did not drop to 0 ppm. This could be due to the presence of higher concentration of dissolved sodium and chloride ions in high TDS brine, which affects the mass transfer of the scavenger. The scavenger molecule requires more time to dissolve in high TDS brine as compared to low TDS brine. If the same test was run for a longer retention time, the inventor could achieve 0 ppm in the final vapor concentration.

Thermally exposed samples of the final product were able to reduce hydrogen sulfide content with efficiency ranging from about 86%-99%. The slight reduction in the scavenging performance of the thermally exposed samples as compared to the neat samples can be attributed to increase in the viscosity of the sample after heating. As the fluid viscosity increases, the molecular interaction of the scavenger with $H_2S$ decreases due to lower mobility of the scavenger molecules. This results in slowing down the mass transfer, hence scavenging efficiency is reduced.

A corrosion evaluation was also carried out in connection with certain scavengers disclosed in the present application. The corrosion evaluation was carried out using the static autoclave testing procedure for evaluation of general and pitting corrosion under stagnant conditions at elevated temperature and pressure.

The static autoclave test was set up to generate LPR data and electrodes also served as mass loss coupons. The coupons used were C-1018 (mild steel) and K-55. A K-55 coupon is a high-performance alloy with low contents of nickel and silicon. It is precipitation hardened and exhibits high strength, acceptable electrical conductivity and good bending properties. Moreover, it possesses excellent resistance to stress relaxation at elevated temperatures of up to about 200° C. The coupon dimensions were ¼" diameter×1" length with an A 5-40 threaded hole in one end and an exposed coupon area of 5.30 cm². The autoclave material was Hastelloy C-276 with a 350 mL capacity. After mounting the electrodes and assembling all parts, the autoclave was de-aerated with $CO_2$ and vacuum three times. 300 mL of the scavenger:

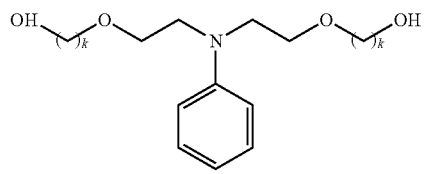

(neat, not thermally exposed, containing dissolved oxygen) was then transferred into the autoclave using vacuum. After charging the fluids, the autoclave was heated to about 200°

C. with required CO$_2$. LPR measurements were taken on each channel every 10 minutes. The procedure lasted for about 21 days. After cooling down and depressurizing the autoclave, the electrodes were removed, cleaned in inhibited HCl, dried and weighed to obtain a general corrosion rate. Additionally, the electrodes were microscopically evaluated for localized attack. Data from this test indicated corrosion rates between about 0.04 and about 0.1 mmpy for the composition where "k"=1.

The presently disclosed scavengers are also thermally stable. As can be seen in FIG. 1, which relates to the compound where "k"=1, thermal gravimetric analysis of the scavenger:

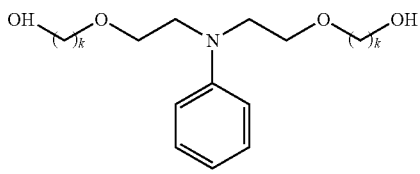

was carried out and the results indicated that the scavenger was thermally stable at 200° C.

Thermal gravimetric analysis is a method of thermal analysis in which changes in physical and chemical properties of materials are measured as a function of increasing temperature, or as a function of time. It is an analytical technique used to determine a material's thermal stability and its fraction of volatile components by monitoring the weight change that occurs as a specimen is heated. The measurement is normally carried out in air or in an inert atmosphere, such as helium or argon, and the weight is recorded as a function of increasing temperature.

In general, a sample is added into the sample pan that is supported by a precision balance. The pan resides in a furnace and may be heated or cooled during the experiment. The mass of the sample is monitored during the experiment. A sample purge gas controls the sample environment. A thermal curve is then displayed as function of weight percent on the Y-coordinate and temperature or time on the X-coordinate.

The thermal stability of the active H$_2$S scavenger was analyzed by thermal gravimetric analysis. In some embodiments, the active H$_2$S scavenger may not be 100% active and may contain trace amounts of non-active components after synthesis. The curve as shown in FIG. 1 displays approximately 86% of the scavenger is still present at 200° C. in the thermal gravimetric analysis. This corresponds to the original yielded concentration of active scavenger as prepared for the evaluation.

A dynamic scale loop (DSL) test was also carried out on the scavenger:

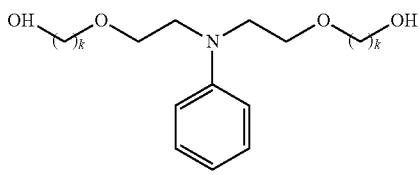

to show that a scale inhibitor does not need to be used with the scavengers of the present application. The presently disclosed scavengers take a long period of time before they show a drop in differential pressure.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a scavenger" is intended to include "at least one scavenger" or "one or more scavengers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of treating hydrogen sulfide in a stream comprising:
adding a composition to a stream comprising an amount of hydrogen sulfide, wherein the composition comprises one or more scavenger compounds having the following general formula:

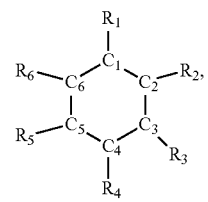

wherein $C_1$-$C_6$ are independently selected from the group consisting of carbon, nitrogen, oxygen, and sulfur; $R_1$-$R_6$ are independently selected from hydrogen or

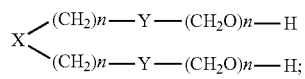

X is nitrogen; Y is selected from the group consisting of nitrogen, oxygen, and sulfur; and each n is independently selected from a number in a range of 1-6; wherein at least one of $R_1$-$R_6$ is

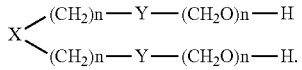

2. The method of claim 1, wherein the stream is a liquid stream or a gaseous stream.

3. The method of claim 1, wherein the stream comprises one or more hydrocarbons.

4. The method of claim 1, wherein the composition excludes triazine compounds.

5. The method of claim 1, wherein the composition comprises a solvent selected from the group consisting of isopropanol, methanol, toluene, water, xylene, ethylene glycols, propylene glycols, and any combination thereof.

6. The method of claim 5, wherein the solvent comprises from about 10% to about 99%, by weight, of the one or more scavenger compounds.

7. The method of claim 6, wherein the solvent comprises from about 30% to about 70%, by weight, of the one or more scavenger compounds.

8. The method of claim 1, wherein the one or more scavengers are thermally stable at a temperature of about 200° C.

9. The method of claim 1, wherein the composition comprises one or more additives selected from the group consisting of asphaltene inhibitors, paraffin inhibitors, corrosion inhibitors, scale inhibitors, emulsifiers, water clarifiers, dispersants, emulsion breakers, additional hydrogen sulfide scavengers, gas hydrate inhibitors, biocides, pH modifiers, surfactants, solvents, and any combination thereof.

10. The method of claim 1, wherein the stream is used in the production, transportation, storage, and/or separation of crude oil or natural gas.

11. The method of claim 1, wherein the stream is used or produced in a coal-fired process, a waste-water process, a farm, a slaughter house, a land-fill, a mining operation, a pulp and paper facility, or a biofuel process.

12. The method of claim 1, wherein the method lowers the amount of hydrogen sulfide in the stream by about 85% to about 100%.

13. The method of claim 1, wherein a ratio of an amount of the one or more scavenger compounds added to the stream to the amount of hydrogen sulfide is from about 1:1 to about 30:1.

14. The method of claim 1, wherein the one or more scavenger compounds are non-corrosive.

15. The method of claim 1, wherein the one or more scavenger compounds comprise a member selected from the group consisting of

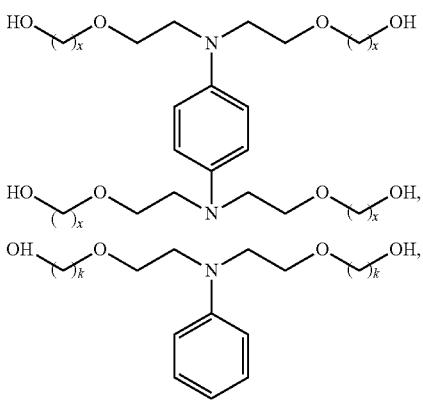

and any combination thereof, wherein x and k are 1.

* * * * *